US011003570B2

(12) United States Patent
Ren et al.

(10) Patent No.: US 11,003,570 B2
(45) Date of Patent: May 11, 2021

(54) PERFORMING A MIRROR TEST FOR LOCALIZATION TESTING

(71) Applicants: Yi-Qun Ren, Shanghai (CN); Hai-Ying Liu, Shanghai (CN); Zhi-Yuan Jing, Shanghai (CN); HEWLETT PACKARD ENTERPRISE DEVELOPMENT LP, Houston, TX (US)

(72) Inventors: Yi-Qun Ren, Shanghai (CN); Hai-Ying Liu, Shanghai (CN); Zhi-Yuan Jing, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 92 days.

(21) Appl. No.: 15/117,134

(22) PCT Filed: Apr. 30, 2014

(86) PCT No.: PCT/CN2014/076604
§ 371 (c)(1),
(2) Date: Apr. 10, 2017

(87) PCT Pub. No.: WO2015/165078
PCT Pub. Date: Nov. 5, 2015

(65) Prior Publication Data
US 2017/0220452 A1    Aug. 3, 2017

(51) Int. Cl.
*G06F 11/36*      (2006.01)
(52) U.S. Cl.
CPC ...... *G06F 11/3664* (2013.01); *G06F 11/3688* (2013.01)

(58) Field of Classification Search
CPC ........ G06F 11/366–3688; G06F 11/263–2635; G06F 11/34–3438; G06F 11/36–3696
See application file for complete search history.

(56) References Cited

U.S. PATENT DOCUMENTS 5,758,062 A * 5/1998 McMahon .......... G06F 11/3688
714/33
6,047,389 A * 4/2000 Thai .................... G06F 11/3656
714/38.12

(Continued)

FOREIGN PATENT DOCUMENTS

CN    1949186 A     4/2007
CN    101001183 A   7/2007

(Continued)

OTHER PUBLICATIONS

Mercury, Mercury QuickTest Professional Tutorial, Version 9.2, published by Mercury, 2007, pp. 3, 4, 13-15, 23-30, 33-35, 83-93.*

(Continued)

*Primary Examiner* — S. Sough
*Assistant Examiner* — Zheng Wei

(57) ABSTRACT

Performing a mirror test for localization testing includes executing a mirror test, the mirror test includes an execution of actions on target controls on a master device and mimicking the actions on the target controls on a number of slave devices for localization testing, identifying the target controls on the number of slave devices to mimic the execution of the actions on the target controls of the master device, capturing at least one screenshot of the mirror test, and displaying the at least one screenshot to a user.

19 Claims, 6 Drawing Sheets

(56) References Cited

U.S. PATENT DOCUMENTS

| | | | | |
|---|---|---|---|---|
| 6,360,332 | B1* | 3/2002 | Weinberg | G06F 11/3664 714/38.13 |
| 7,454,660 | B1* | 11/2008 | Kolb | G06F 11/3414 714/38.14 |
| 7,793,269 | B2 | 9/2010 | Singonahalli et al. | |
| 8,448,134 | B1* | 5/2013 | Boczarski | G06F 11/3684 717/105 |
| 8,539,435 | B1* | 9/2013 | Rovang | G06F 11/3414 714/38.1 |
| 8,881,109 | B1* | 11/2014 | Bridges, Sr. | G06F 11/263 717/125 |
| 8,904,358 | B1* | 12/2014 | Peri-Glass | G06F 11/3608 717/126 |
| 9,465,726 | B2* | 10/2016 | Kozhuharov | G06F 11/3696 |
| 9,740,506 | B2* | 8/2017 | Ren | G06F 9/451 |
| 2002/0122065 | A1* | 9/2002 | Segal | G06F 21/56 715/783 |
| 2003/0055883 | A1* | 3/2003 | Wiles, Jr. | G06F 11/3414 709/203 |
| 2003/0236775 | A1* | 12/2003 | Patterson | G06F 11/368 |
| 2006/0031054 | A1* | 2/2006 | Nace | G06F 11/3419 703/13 |
| 2006/0277231 | A1 | 12/2006 | Kral et al. | |
| 2007/0130528 | A1* | 6/2007 | Johnson | G06F 9/451 715/761 |
| 2008/0263526 | A1 | 10/2008 | Urra et al. | |
| 2008/0295076 | A1* | 11/2008 | McKain | G06F 9/451 717/124 |
| 2009/0037896 | A1* | 2/2009 | Grechanik | G06F 8/65 717/168 |
| 2009/0204945 | A1 | 8/2009 | Jain et al. | |
| 2009/0265689 | A1* | 10/2009 | Gooi | G06F 11/3688 717/125 |
| 2010/0030548 | A1 | 2/2010 | Glowacki et al. | |
| 2010/0131928 | A1* | 5/2010 | Parthasarathy | G06F 11/3664 717/126 |
| 2011/0307864 | A1* | 12/2011 | Grechanik | G06F 11/3604 717/124 |
| 2012/0124495 | A1* | 5/2012 | Amichai | G06F 8/34 715/762 |
| 2012/0204091 | A1* | 8/2012 | Sullivan | G06F 11/3664 715/234 |
| 2013/0014084 | A1 | 1/2013 | Sahibzada et al. | |
| 2013/0117731 | A1* | 5/2013 | LeSuer | G06F 11/3672 717/125 |
| 2013/0132893 | A1* | 5/2013 | Du | G06F 9/451 715/786 |
| 2013/0145294 | A1* | 6/2013 | Thiruvillamalai | G06F 11/3672 715/764 |
| 2013/0179865 | A1 | 7/2013 | Neumeyer et al. | |
| 2013/0219220 | A1* | 8/2013 | Kraus | G06F 11/263 714/32 |
| 2013/0290075 | A1 | 10/2013 | Kathooria et al. | |
| 2014/0229920 | A1* | 8/2014 | Rossi | G06F 11/3664 717/125 |
| 2014/0237455 | A1* | 8/2014 | Koneru | G06F 11/3688 717/131 |
| 2014/0331205 | A1* | 11/2014 | Singh | G06F 11/3688 717/124 |
| 2014/0331209 | A1* | 11/2014 | Singh | G06F 11/3688 717/127 |
| 2014/0366005 | A1* | 12/2014 | Kozhuharov | G06F 11/3696 717/125 |

FOREIGN PATENT DOCUMENTS

| | | |
|---|---|---|
| CN | 103577320 A | 2/2014 |
| IN | 44/CHE/2011 | 2/2011 |

OTHER PUBLICATIONS

International Search Report & Written Opinion received in PCT Application No. PCT/CN2014/076604, dated Jan. 30, 2015, 7 pages.

Microsoft, "Globalization Step-by-Step: Localizability Testing," (Web Page), Jan. 22, 2006, 3 pages, available at http://msdn.microsoft.com/ar-sa/goglobal/bb688150.aspx.

Hewlett Packard Enterprise; "HPE Sprinter, User Guide, Software Version 12.52"; Release date: Jan. 2016; 277 pp.

HP; "HP Unified Functional Testing"; User Guide, Software Version: 12.52, Windows operating systems; Document Release Date: Jan. 2016; 1,148 pp.

SDL Group; "SDL Passolo 2016, Getting Started"; http://www.sdl.com; Mar. 2016; 32 pp.

* cited by examiner

PERFORMING A MIRROR TEST FOR LOCALIZATION TESTING

BACKGROUND

Computer programs are often designed for a global market. Such a program will be operated by users who speak a variety of languages. Thus, the human language of the user interface of such a program will need to appear in a variety of human languages. Consequently, to design computer programs for the global market, localization testing for the computer programs is performed to verify the functionality and translation of the computer programs after the computer programs are localized into different languages. As a result, unintended behaviors of the computer program due to translation are eliminated when localizing the computer program from one language into another language.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
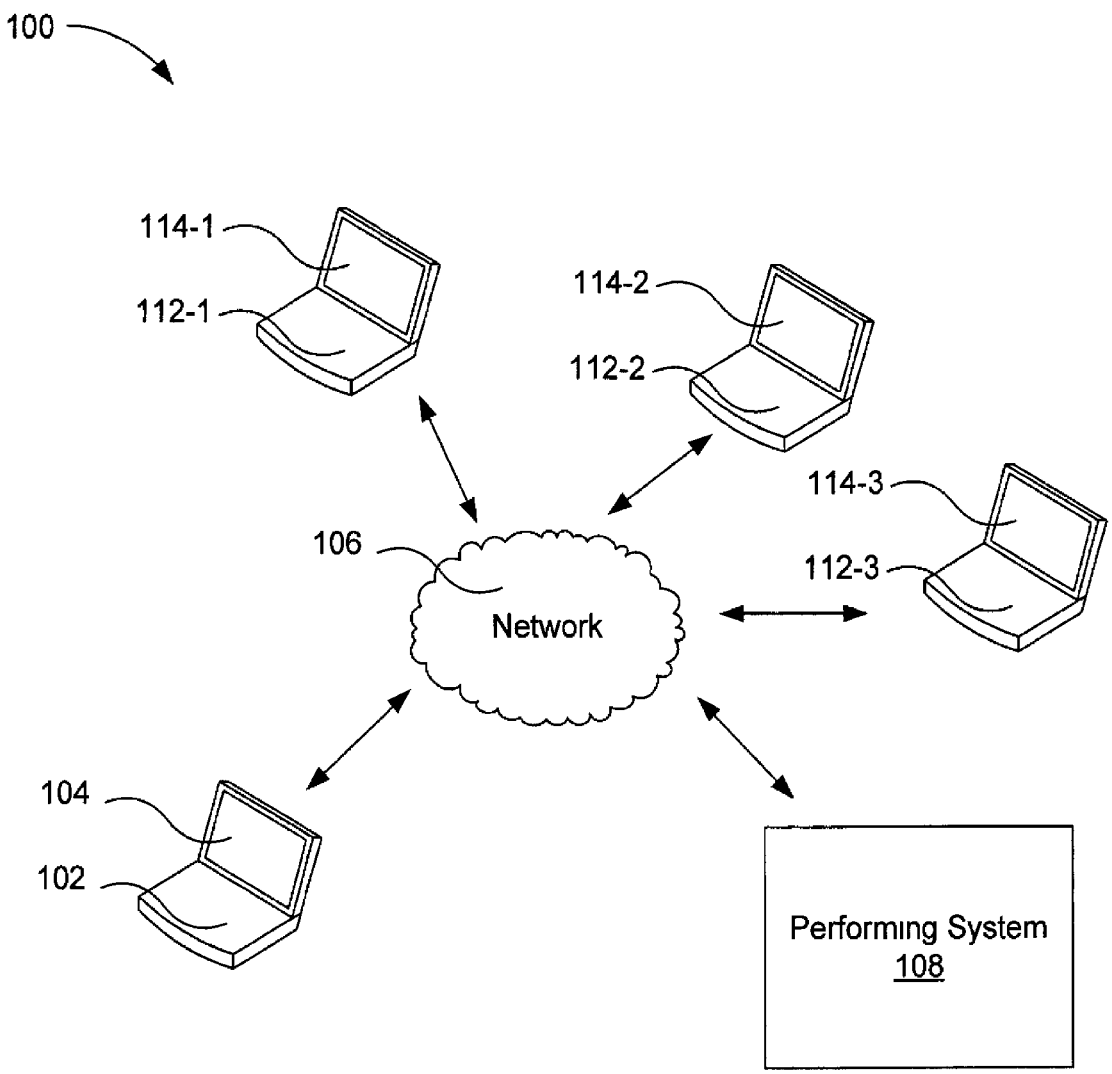
FIG. 1 is a diagram of an example of a system for performing a mirror test for localization testing, according to one example of principles described herein.

As mentioned above, computer programs are often designed for a global market. To design computer programs for the global market, localization testing for the computer programs is performed in several languages spoken by different users in different parts of the world. Often, localization testing is performed manually. For example, if a computer program is translated from one language into ten different languages, the localization testing is manually performed ten different times.

Manually performing the localization testing can be a burdensome task when translating several computer programs into several languages. Further, this can be costly and overly complicated. Still further, manually performing the localization testing repeatedly can be prone to human error.

The principles described herein include a method for performing a mirror test for localization testing. Such a method includes executing a mirror test, the mirror test includes an execution of actions on target controls on a master device and mimicking the actions on the target controls on a number of slave devices for localization testing, identifying the target controls on the number of slave devices to mimic the execution of the actions on the target controls of the master device, capturing at least one screenshot of the mirror test, and displaying the at least one screenshot to a user. Such a method allows the localization testing of a computer program, being localized into several languages, to be performed in parallel. As a result, the localization testing can be performed quickly and effectively for several languages.

In the present specification and in the appended claims, the term "screenshot" is meant to be understood broadly as an image captured at a moment in time which represents contents displayed on a display. In one example, a screenshot may be captured at any time during a mirror test for localization testing. As will be described below, a screenshot may be captured on a master device, a number of slave devices, other devices, or combinations thereof.

In the present specification and in the appended claims, the term "target control" is meant to be understood broadly as an item associated with a computer program that is displayed to a user, via a display, and acted upon by an action. In one example, a target control may be an item such as a menu, a list, a search box, an icon, a link, or other target controls.

In the present specification and in the appended claims, the term "action" is meant to be understood broadly as performing a function, as specified by a user, on a target control via inputs of a master device. For example, a user may use an input, such as a mouse, to click on a target control. In this example, the action may be the user clicking on the target control. As will be described below, any action performed on a master device will be mimicked on a number of slave devices.

Still further, the term "identification properties (IPs)" is meant to be broadly understood as metadata that is used to identify target controls. In one example, IPs may be hypertext markup language (HTML) identifications, texts, indexes, locations, button names, other IPs, or combinations thereof.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for performing a mirror test for localization testing, according to one example of principles described herein. As will be described below, a performing system is in communication with a network to execute a mirror test, the mirror test includes an execution of actions on target controls on a master device and mimicking the actions on the target controls on a number of slave devices for localization testing. The performing system identifies the target controls on the number of slave devices to mimic the execution of the actions on the target controls of the master device. Further, the performing system captures at least one screenshot of the mirror test and displays the at least one screenshot to a user.

As illustrated in FIG. 1, the system (100) includes a master device (102) with a display (104). In this example, a user may use the master device (102) to perform a mirror test for localization testing. In one example, the user may be an engineer, or a specialized engineer, such as a quality assurance engineer. As will be described below, the localization testing performed on the master device (102) will also be performed on several slave devices (112) in parallel. In this example, the system (100) includes three salve devices (112).

As illustrated in FIG. 1, the system (100) includes a performing system (108). In one example, the performing system (108) executes a mirror test. In this example, the mirror test includes an execution of actions on target controls on a master device (102) and mimicking the actions on the target controls on the slave devices (112) for localization testing. For example, if a user uses the master device (102) to click on an item, such as an icon displayed on the display (104) of the master device (102), the same items displayed on the slave devices' display (114) are also clicked on.

The performing system (108) identifies the target controls on the slave devices (112) to mimic the execution of the actions on the target controls of the master device (102). In one example, identifying the target controls on the slave devices (112) includes identifying the target controls via first priority IPs, second priority IPs, or third priority IPs.

Further, the performing system (108) captures at least one screenshot of the mirror test. In one example, the screenshot may be analyzed for accuracy by a user such as a linguistics engineer.

The performing system (108) further displays the at least one screenshot to the user. In one example, the performing system (108) displays several screenshots to the user. As a result, the localization testing can be performed quickly and effectively for several languages. More information about the performing system (108) will be described later on in this specification.

While this example has been described with reference to the performing system being located over the network, the performing system may be located in any appropriate location according to the principles described herein. For example, the performing system may be located in a user device, a server, a datacenter, a slave device, a master device, other locations, or combinations thereof.

While this example has been described with reference to the system containing three slave devices, the system may contain several slave devices. For example, the system may contain twenty slave devices.

Figure 2:
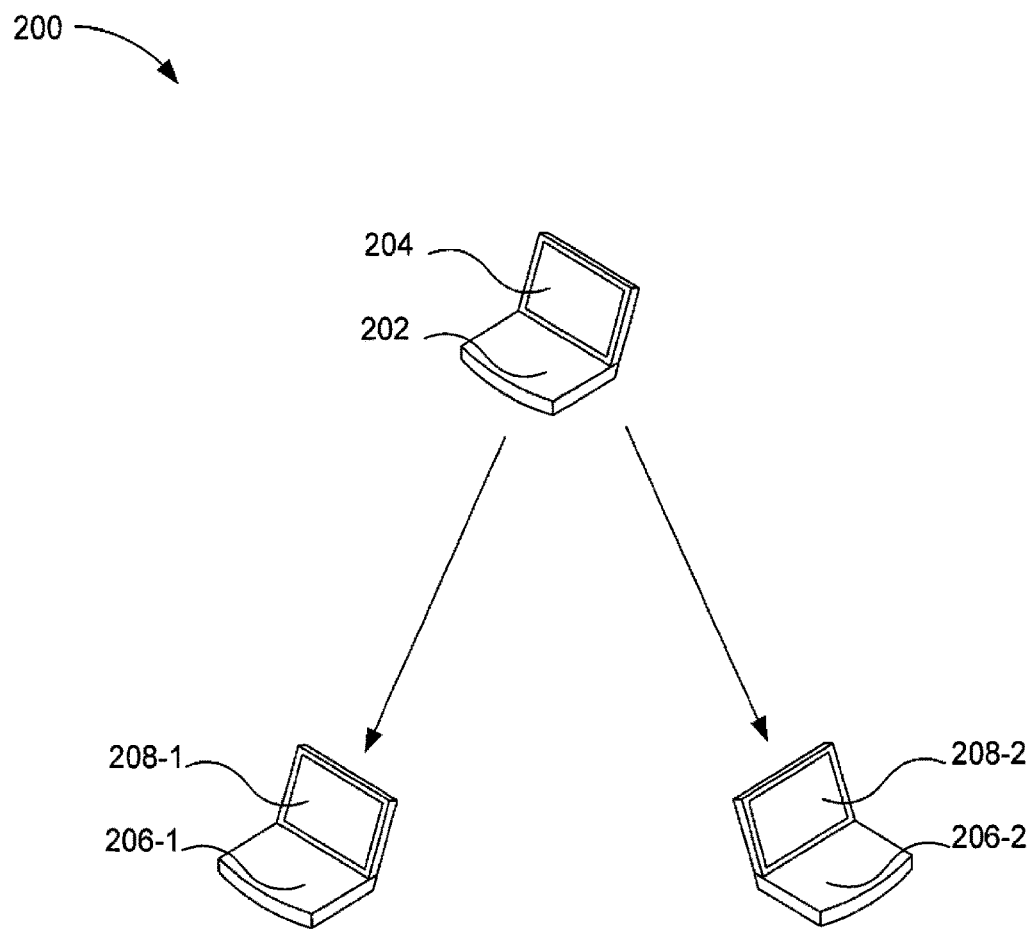
FIG. 2 is a diagram of an example of a system for performing a mirror test for localization testing, according to one example of principles described herein.

FIG. 2 is a diagram of an example of a system for performing a mirror test for localization testing, according to one example of principles described herein. As will be described below, when a user performs an action, such as clicking a button on the master device, the master device records the IPs of target control. For example, a label of the clicked button and the action. The information regarding the target control and action, as well as the IPs associated with the target control, are sent to all the slave devices in the system. Each slave device identifies the target control according to the received IPs, and performs the same action. As a result, any action executed on the master device is replicated on all of the slave devices.

As illustrated in FIG. 2, the system (200) includes a master device (202). The master device (202) may include a display (204). In one example, a mirror test for localization testing may be performed. In this example, the localization testing is executed on the master device (202) and in parallel on the slave devices (206).

For example, a user may perform a mirror test by executing an action on a target control, such as clicking a web button, on the master device (202). In this example, executing the target controls on the master device (202) records IPs of the target controls and the actions. In one example, the IPs may be a HTML identification, a translated text, an index, or a location.

In this example, by executing the action on the target control, the performing system of FIG. 1 sends the IPs of the target controls and the actions to the slave devices (206). Once the IPs of the target controls and the actions are received by the slave devices (206), the performing system of FIG. 1 identifies the target controls on the slave devices (206) to mimic the execution of the actions on the target controls of the master device (202).

In one example, identifying the target controls on the slave devices includes translating IPs using a translation string-map. For example, the translation string-map maps a string written in a specific language to the string in a different language and vice versa. For example, the translation string-map can map a string written in English to a string written in Japanese. In one example, the translation string-map is generated as part of globalization development, for example by processing the output of a globalization tool. Further, the translation string-map supports patterns and parameters. As a result, the translation string-map can handle complex translation cases, which cannot be handled by common translation solution, such as translations via dictionaries.

In another example, identifying the target controls on the slave devices includes identifying the target controls via first priority IPs, second priority IPs, or third priority IPs. For example, the performing system of FIG. 1 identifies target controls via first priority IPs, and reverts to second priority IPs only if unable to locate the target control. Third priority IPs is just a backup solution. For example, when the slave devices (206) search for a target control, such as a web control, the performing system of FIG. 1 tries to identify the target control via a first priority IP such as an HTML identification. If the target control does not contain HTML identification, the performing system of FIG. 1 tries to identify the target control via a second priority IP such as translated text. If the target control does not contain translated text, the performing system of FIG. 1 tries to identify the target control via third priority IPs such as index or location.

As mentioned above, the performing system of FIG. 1 captures at least one screenshot of the mirror test. Further, the performing system displays the at least one screenshot of the mirror test to a user. In one example, a screenshot may be captured at any time during the localization testing. Further, a screenshot may be captured on the master device (202), the slave devices (206), other devices, or combinations thereof. More information about capturing the screenshot and displaying the screenshot will be described in more detail later on in this specification.

While this example has been described with reference to the mirror test being executed by a user, the mirror test by be executed by the performing system of FIG. 1. For example, the performing system of FIG. 1 may receive a specific mirror test to be performed. In this example, the specific mirror test may be designed by a user and uploaded to the performing system of FIG. 1. Once the mirror test is received, the performing system of FIG. 1 executes the mirror test. In another example, the performing system of FIG. 1 monitors the master device such that actions performed, by a user, on the target controls are received by the performing system of FIG. 1. Further, the performing system of FIG. 1 executes the actions performed on the target controls of the master device on the slave devices as described above.

Figure 3:
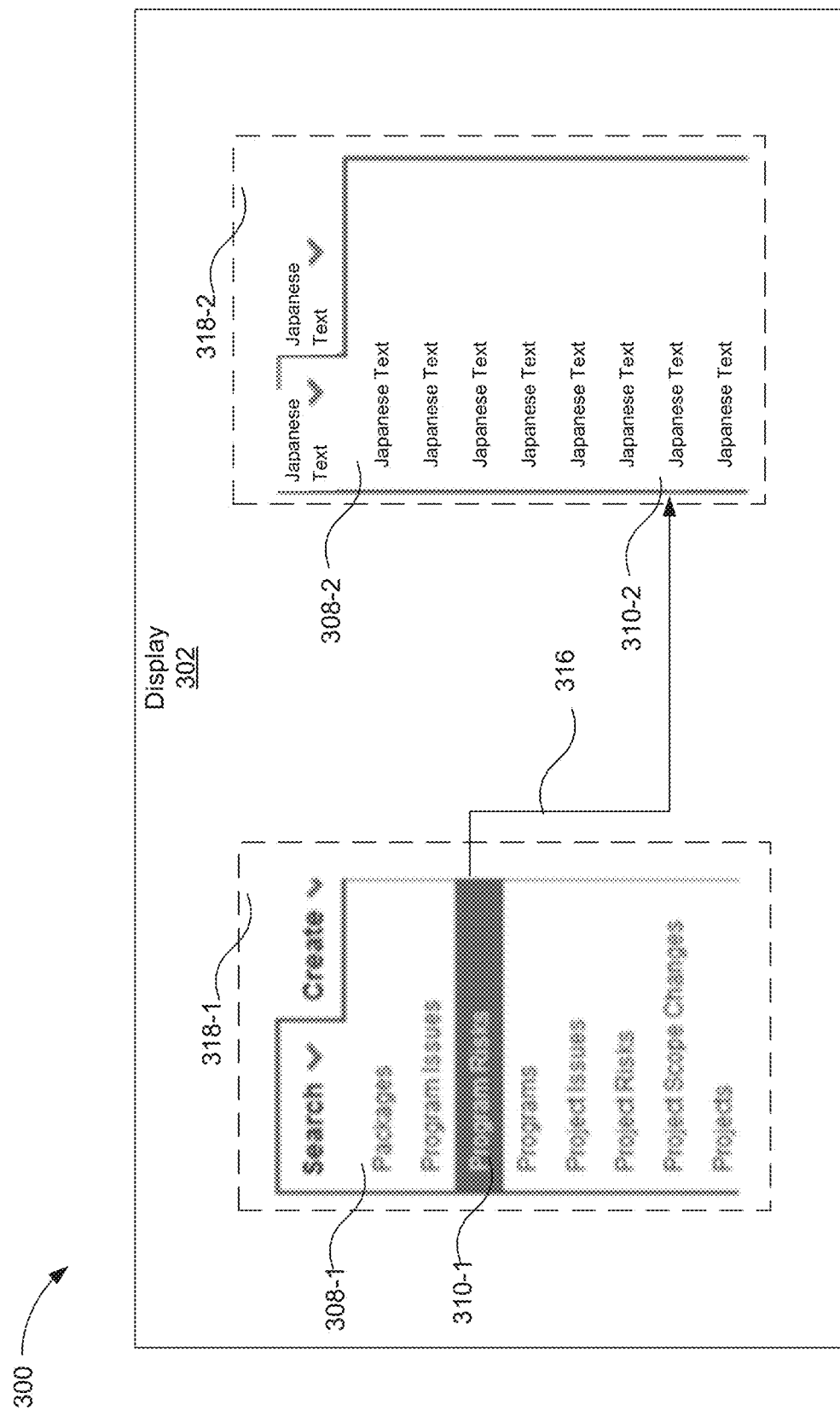
FIG. 3 is a diagram of an example of a mirror test via a translation string-map, according to one example of principles described herein.

FIG. 3 is a diagram of an example of a mirror test via a translation string map, according to one example of principles described herein. As mentioned above, identifying the target controls on the number of slave devices includes translating IPs using a translation string-map. For example, the translation string-map can map a string of one language to the string in another language and vice versa. In one example, the translation string-map is generated as part of globalization development, for example by processing the output of a globalization tool. Further, the translation string-map supports patterns and parameters. As a result, the translation string-map can handle complex translation cases, which cannot be handled by common translation solution, such as translations via dictionaries.

As illustrated in FIG. 3, a number of menus (318) are displayed on a display (302). As illustrated, the menus include an English menu (318-1) and a Japanese menu (318-2). In one example, the English menu (318-1) may correspond to a master device. The Japanese menu (318-2) may correspond to a slave device.

In this example, the menus (318) may not be identical. For example, the menu's items (308) may appear in different orders or positions. To resolve this issue, the performing system of FIG. 1 prioritizes IPs associated with the target control. When a user performs an action, the master device records the IPs of the target control and sends the IPs to each slave device. Each slave device then identifies the target according to received IPs and performs an identical action.

As illustrated in FIG. 3, the position of the items (308-1) in the English menu (318-1) is different for the items (308-2) in the Japanese menu (318-2). For example, the third item (310-1) in the English menu (318-1) is program risks. Further, the position of the Japanese translation for program risks is the seventh item (310-2) in the Japanese menu (318-2).

When the performing system of FIG. 1 tries to identify the target controls on the slave devices to mimic the execution of the actions on the target controls of the master device, the performing system of FIG. 1 tries to identify the target controls in the Japanese menu (318-2) according to the IPs received from the master device.

For example, the performing system of FIG. 1 tries to identify the target controls on the slave devices by identifying the target controls via first priority IPs. In this example, the first priority IPs may be a HTML identification. In this example, the performing system of FIG. 1 fails to identify the target controls on the slave devices by identifying the target controls via the first priority IPs.

If the performing system of FIG. 1 fails to identify the target controls on the slave devices via first priority IPs, the performing system of FIG. 1 tries to identify the target controls on the slave devices by identifying the target controls via second priority IPs. In this example, the second priority IPs may be translating IPs using a translation string-map.

In this example, the performing system of FIG. 1 identifies the target controls on the slave devices by translating program risks via translation string-map. As illustrated in FIG. 3, the performing system of FIG. 1 successfully identifies the seventh item (310-2) in the Japanese menu (318-2) to correspond to the third item (310-1) in the English menu (318-1) as indicated by arrow 316.

Further, in case the target control still cannot be identified by the performing system of FIG. 1, users, such as a quality assurance engineer, can operate the target control with special localized version manually. In another example, in case the target control still cannot be identified by the performing system of FIG. 1 program developers may add more IPs.

Figure 4:
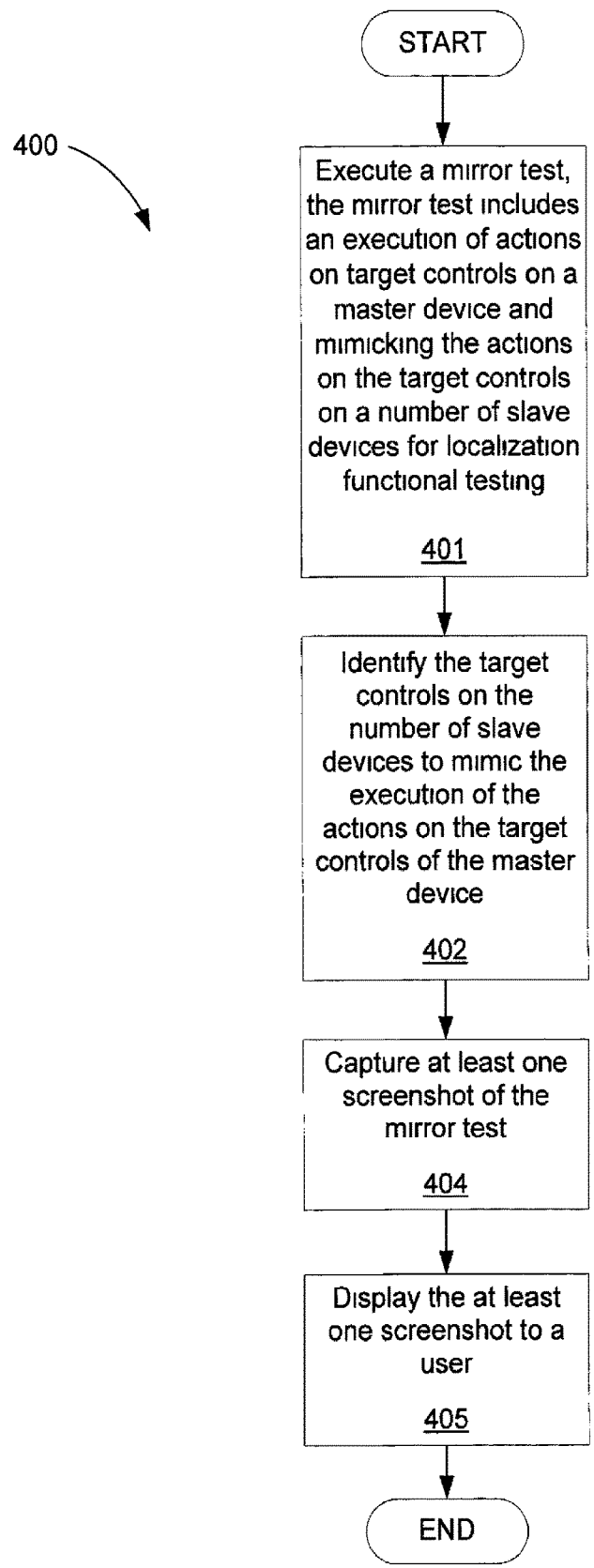
FIG. 4 is a flowchart of an example of a method for performing a mirror test for localization testing, according to one example of principles described herein.

FIG. 4 is a flowchart of an example of a method for performing a mirror test for localization testing, according to one example of principles described herein. In one example, the method (400) may be executed by the performing of FIG. 1. In other examples, the method (400) may be executed by other systems such as system 600 or system 700. In this example, the method (400) includes executing (401) a mirror test, the mirror test includes an execution of actions on target controls on a master device and mimicking the actions on the target controls on a number of slave devices for localization testing, identifying (402) the target controls on the number of slave devices to mimic the execution of the actions on the target controls of the master device, capturing (403) at least one screenshot of the mirror test, and displaying (404) the at least one screenshot to a user.

As mentioned above, the method (400) includes executing (401) a mirror test, the mirror test includes an execution of target controls and actions on a master device and mimicking the actions on the target controls on a number of slave devices for localization testing. In one example, the execution of the actions on the target controls on the master device may include recording IPs of the target controls and actions. For example, when a user of the master device clicks a search button, the IPs of the target controls and actions will be recorded. In one example, the IPs may include a HTML identification, a translated text, an index, a location, or combinations thereof. As will be describe later on in this specification the target controls are sent to the number of slave devices.

As mentioned above, the method (400) includes identifying (402) the target controls on the number of slave devices to mimic the execution of the actions on the target controls of the master device. In one example, identifying the target controls on the slave devices includes translating IPs using a translation string-map.

For example, the translation string-map can map a string of one language to the string in another language, and vice versa. In one example, the translation string-map is generated as part of globalization development, for example by processing the output of a globalization. The translation string-map is more accurate than common translation solution, such as translations via dictionaries, because the translation string-map matches the translation used by a globalization developer. Further, the translation string-map supports patterns and parameters. As a result, the translation string-map can handle complex translation cases, which cannot be handled by common translation solution, such as translations via dictionaries.

Further, the method (400) supports globalization checkpoints such as checking translation via translation string-map and checking data format. Checking translation via translation string-map instead of checking translation via dictionaries reduces the chance of a fake alarm occurring on a translated string. In some examples, parts of the string are to be translated. For example, the string "About Company X Run Results Viewer" may demand that "About" is to be translated. In this example, "Company X Run Results Viewer" may not need to be translated. However, checking translations via dictionaries will request the entire string to be translated. As a result, a fake alarm may occur. If the translation string-map is used for checking translation, it will know that "About" should be translated and "Company X Run Results Viewer" should not be translated. As a result, an alarm may not occur. In other examples, the method (400) avoids missing untranslated source text. If an untranslated source text if identified, an alarm may occur. In one example, an alarm may alert a user via a user interface.

As mentioned above, the method (400) supports globalization checkpoints such as checking data format. Checking data format may include a date format. For example, for some languages and cultures, the month is presented before the day. For example, Feb. 12, 2014. In other examples, the day is presented before the month. For example, 12 Feb. 2014. The method (400) further checks for truncation and concatenation issues.

In another example, identifying the target controls on the number of slave devices includes identifying the target controls via first priority IPs, second priority IPs, or third priority IPs. For example, the performing system of FIG. 1 identifies target controls via first priority IPs, and reverts to second priority IPs only if unable to locate the target control. Third priority IPs is just a backup solution. For example, when the slave devices search for a target control, such as a web control, the performing system of FIG. 1 tries to identify the target control via a first priority IP such as a HTML identification. If the target control does not contain HTML identification, the performing system of FIG. 1 tries to identify the target control via a second priority IP such as translated text. If the target control does not contain translated text, the performing system of FIG. 1 tries to identify the target control via third priority IPs such as index or location.

As mentioned above, the method (400) includes capturing (403) at least one screenshot of the mirror test. In one example, a screenshot may be captured at any time during the mirror test for localization testing. The screenshot may be captured on a master device, a number of slave devices, other devices, or combinations thereof. In one example, the method may capture several screenshots of the mirror test. Further, once the screenshot is captured, the screenshot may be sent to several users for analysis.

As mentioned above, the method (400) includes displaying (405) the at least one screenshot to a user. As mentioned above, once the screenshot is captured, the screenshot may be sent to several users for analysis. In one example, the screenshot may be displayed on the master device. In another example, the screenshot may be displayed on the slave devices. In yet another example, the screenshot may be displayed on any appropriate device, such as a user device, a smart phone, a watch, other devices, or combinations thereof.

Figure 5:
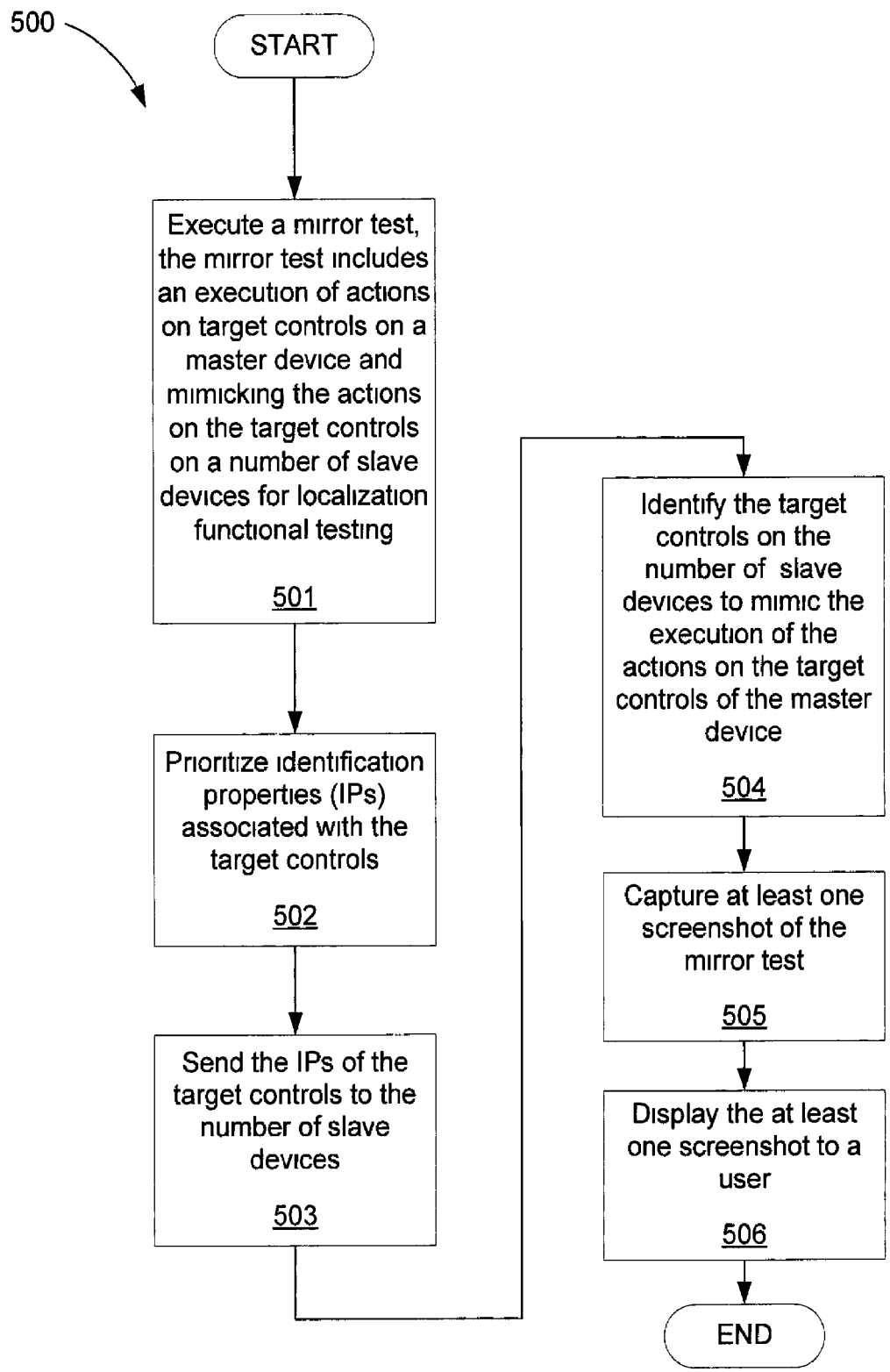
FIG. 5 is a flowchart of an example of a method for performing a mirror test for localization testing, according to one example of principles described herein.

FIG. 5 is a flowchart of an example of a method for performing a mirror test for localization testing, according to one example of principles described herein. In one example, the method (500) may be executed by the performing of FIG. 1. In other examples, the method (500) may be executed by other systems such as system 600 or system 700. In this example, the method (500) includes executing (501) a mirror test, the mirror test includes an execution of actions on target controls on a master device and mimicking the actions on the target controls on a number of slave devices for localization testing, prioritizing (502) IPs associated with the target controls, sending (503) the IPs of the target controls to the number of slave devices, identifying (504) the target controls on the number of slave devices to mimic the execution of the actions on the target controls of the master device, capturing (505) at least one screenshot of the mirror test, and displaying (506) the at least one screen shot to a user.

As mentioned above, the method (500) includes prioritizing (502) the IPs associated with the target controls. In one example, the performing system of FIG. 1 prioritizes IPs according to the likelihood that an IP of an English version of the computer program will match an IP of localized versions of the computer program for a first priority IP. In one example, the method (500) may categorize the IPs into three categories. For example, a first priority IP, a second priority IP, or a third priority IP.

In one example, the priorities for the IPs may be a default setting. For example, a first priority IP may be an automation identification or a HTML identification. The second priority IP may be a translated text via a translation string-map. The third priority IP may be an index or a location.

In other examples, the priorities for the IPs may be modified by a user. For example, a first priority IP may be an automation identification or a HTML identification. The second priority IP may be index or a location. The third priority IP may be a translated text via a translation string-map.

As mentioned above, the method (500) includes sending (503) the IPs of the target controls to the number of slave devices. As mentioned above, the actions on target controls on the master device may include recording IPs of the target controls and actions. For example, when a user of the master device clicks a search button, the IPs of the target controls and actions will be recorded. Once the IPs of the target controls and actions are recorded on the master device, the method (500) sends the IPs of the target controls and the actions to the number of slave devices to mimic the actions on the target controls of the master device.

Figure 6:
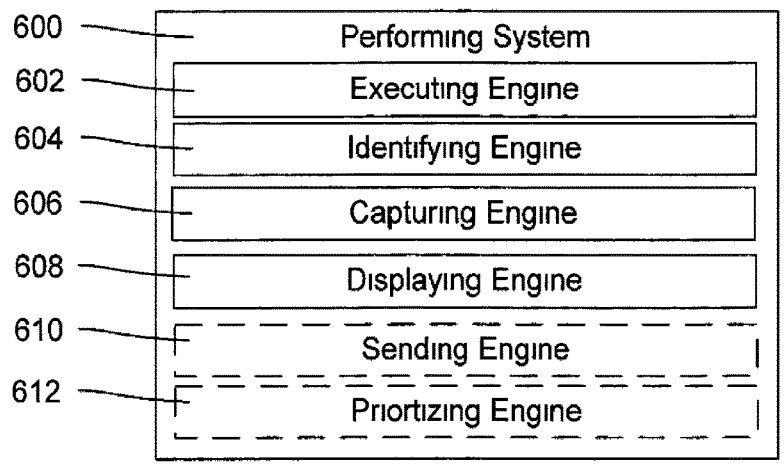
FIG. 6 is a diagram of an example of a performing system, according to one example of principles described herein.

FIG. 6 is a diagram of an example of a performing system, according to one example of principles described herein. The performing system (600) includes an executing engine (602), an identifying engine (604), a capturing engine (606), and a displaying engine (608). In this example, the performing system (600) also includes a sending engine (610) and a prioritizing engine (612). The engines (602, 604, 606, 608, 610, 612) refer to a combination of hardware and program instructions to perform a designated function. Each of the engines (602, 604, 606, 608, 610, 612) may include a processor and memory. The program instructions are stored in the memory and cause the processor to execute the designated function of the engine.

The executing engine (602) executes a mirror test, the mirror test includes an execution of actions on target controls on a master device and mimicking the actions on the target controls on a number of slave devices for localization testing. In one example, the executing engine (602) may receive the target controls and the actions via inputs, from a user, made on the master device. In one example, the executing engine (602) further records IPs of the target controls and the actions of the master device.

The identifying engine (604) identifies the target controls on the number of slave devices to mimic the execution of the actions on the target controls of the master device. In one example, identifying engine (604) identifies the target controls on the number of slave devices by translating IPs using a translation string-map. In one example, identifying engine (604) identifies the target controls on the number of slave devices by identifying the target controls via first priority IPs, second priority IPs, or third priority IPs.

The capturing engine (606) captures at least one screenshot of the mirror test. In one example, the capturing engine (606) captures one screenshot of the mirror test. In another example, the capturing engine (606) captures several screenshots of the mirror test.

The displaying engine (608) displays the at least one screen shot to a user. In one example, the displaying engine (608) displays the at least one screen shot to the user via a display on a master device, a slave device, other devices, or combinations thereof.

The sending engine (610) sends the IPs of the target controls to the number of slave devices. In one example, the sending engine (610) sends several IPs of the target controls to the number of slave devices.

The prioritizing engine (612) prioritizes IPs associated with the target controls. In one example, the prioritizing engine (612) prioritizes IPs associated with the target controls based on a default setting. In another example, the prioritizing engine (612) prioritizes IPs associated with the target controls based on a setting selected by a user, the performing system of FIG. 1, or combinations thereof.

Figure 7:
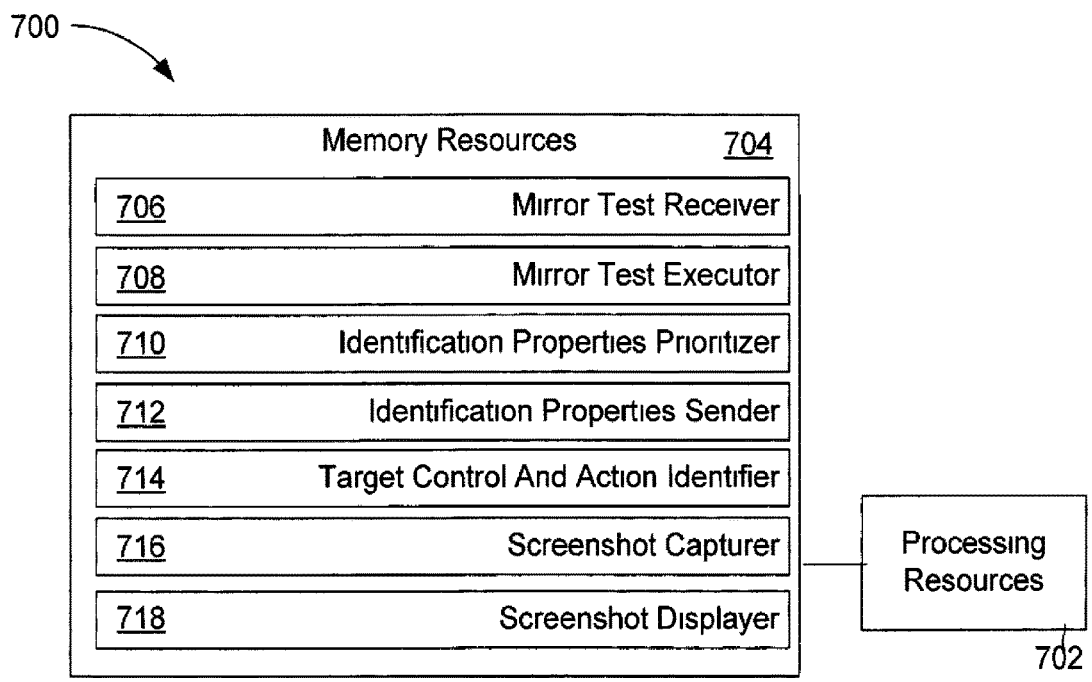
FIG. 7 is a diagram of an example of a performing system, according to one example of principles described herein.

FIG. 7 is a diagram of an example of a performing system, according to one example of principles described herein. In this example, performing system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the performing system (700). The programmed instructions shown stored in the memory resources (704) include a mirror test receiver (706), a mirror test executor (708), an identification properties prioritizer (710), an identification properties sender (712), a target control and action identifier (714), a screenshot capturer (716), and a screenshot displayer (718).

The memory resources (704) include a computer readable storage medium that contains computer readable program code to cause tasks to be executed by the processing resources (702). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The mirror test receiver (706) represents programmed instructions that, when executed, cause the processing resources (702) to receive a mirror test. The mirror test executor (708) represents programmed instructions that, when executed, cause the processing resources (702) to execute the mirror test, the mirror test includes an execution of actions on target controls on a master device and mimicking the actions on the target controls on a number of slave devices for localization testing.

The identification properties prioritizer (710) represents programmed instructions that, when executed, cause the processing resources (702) to prioritize IPs associated with the target controls. The identification properties sender (712) represents programmed instructions that, when executed, cause the processing resources (702) to send IPs of the target controls and the actions to the number of slave devices.

The target control and action identifier (714) represents programmed instructions that, when executed, cause the processing resources (702) to identify the target controls on the number of slave devices to mimic the execution of the actions on the target controls of the master device. The screenshot capturer (716) represents programmed instructions that, when executed, cause the processing resources (702) to capture at least one screenshot of the mirror test. The screenshot displayer (718) represents programmed instructions that, when executed, cause the processing resources (702) to displaying the at least one screen shot to a user.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries, may be accessed from a remote location over a network connection while the programmed instructions are located locally. Thus, the performing system (700) may be implemented on a user device, on a server, on a collection of servers, or combinations thereof.

The performing system (700) of FIG. 7 may be part of a general purpose computer. However, in alternative examples, the performing system (700) is part of an application specific integrated circuit.

The preceding description has been presented to illustrate and describe examples of the principles described. This description is not intended to be exhaustive or to limit these principles to any precise form disclosed. Many modifications and variations are possible in light of the above teachings.

What is claimed is:

1. A method comprising:
   executing a mirror test, the mirror test comprising an execution of actions on target controls on a master device to cause the master device to produce a response to the execution of actions on the target controls on the master device and mimicking the actions on target controls on a number of slave devices for localization functional testing to cause each slave device of the slave devices to produce a response to the mimicked actions on the target controls of the each slave device;
   prioritizing a plurality of identification properties (IPs) associated with the target controls on the master device, wherein the plurality of IPs comprise first IPs associated with a first priority and second IPs associated with a second priority lower than the first priority;
   sending information regarding to the target controls on the master device, the actions, and the prioritized plurality of IPs to the number of slave devices;

searching for the target controls on the number of slave devices to mimic the execution of the actions on the target controls of the master device, wherein searching for the target controls on the number of slave devices comprises:
applying the first IPs in an attempt to find the target controls on the number of slave devices, wherein the first IPs comprise an automated identification; and
in response to the applying of the first IPs failing to find the target controls on the number of slave devices, applying the second IPs to find the target controls on the number of slave devices, wherein the second IPs comprise at least one of a translated text via a translation string-map, an index, and a location;
capturing at least one screenshot of the mirror test to capture the response produced by the master device and at least one response of the responses produced by the slave devices; and
generating data to display the at least one screenshot to a user.

2. The method of claim 1, in which the execution of the actions on the target controls on the master device records IPs of the target controls on the master device and the actions on the target controls of the master device.

3. The method of claim 2, in which the IPs recorded by the master device comprise a hypertext markup language (HTML) identification, the translated text, the index, or the location.

4. The method of claim 1, wherein:
the plurality of IPs further comprises third IPs; and
searching for the target controls on the number of slave devices further comprises, in response to the applying of the second IPs failing to find the target controls on the number of slave devices, applying the third IPs to find the target controls on the number of slave devices.

5. The method of claim 1, wherein the second IPs comprise the translated text via the translation string-map.

6. The method of claim 4, wherein, for a given target control of the target controls on the number of slave devices:
the first IPs comprise a hypertext markup language (HTML) identification to find the given target control; and
the second IPs comprise the translated text via the translation string-map to find the given target control.

7. A system comprising:
a processor; and
a memory storing instructions that, when executed by the processor, cause the processor to:
execute a mirror test, the mirror test comprising an execution of actions on target controls on a master device to cause the master device to produce a response to the execution of actions on the target controls on the master device and mimicking the actions on target controls on a number of slave devices for localization functional testing to cause each slave device of the slave devices to produce a response to the mimicked actions on the target controls of the each slave device;
prioritize a plurality of identification properties (IPs) used to identify the target controls on the number of slave devices, including grouping the plurality of IPs to associate a first group of IPs of the plurality of IPs with a first priority and associate a second group of IPs of the plurality of IPs with a second priority lower than the first priority;
send information regarding to the target controls on the master device, the actions, and the prioritized plurality of IPs to the number of slave devices;
search for the target controls on the number of slave devices to mimic the execution of the actions on the target controls of the master device, wherein searching for the target controls on the number of slave devices comprises, for a given slave device of the slave devices:
applying the first group of IPs in an attempt to identify target controls on the given slave device, wherein the first group of IPs comprise an automated identification; and
in response to the applying of the first group of IPs failing to identify the target controls on the given slave device, applying the second group of IPs to identify the target controls on the given slave device, wherein the second group of IPs comprise at least one of a translated text via a translation string-map, an index, and a location;
capture at least one screenshot of the mirror test to capture the response produced by the master device and at least one response of the responses produced by the slave devices; and
generate data to display the at least one screenshot to a user.

8. The system of claim 7, in which the execution of the actions on the target controls on the master device records IPs of the target controls on the master device and the actions.

9. The system of claim 7, wherein the instructions, when executed by the processor, further cause the processor to further prioritize the plurality of IPs to associate a third group of IPs of the plurality of IPs with a third priority lower than the second priority; and in response to the applying of the second group of IPs failing to identify the target controls on the given slave device, apply the third group of IPs to identify the target controls on the given slave device.

10. The system of claim 7, wherein the instructions, when executed by the processor, further cause the processor to mimic the execution of the actions on the target controls of the master device by translating IPs of the plurality of IPs using the translation string-mapping.

11. A computer program product comprising instructions stored on a non-transitory computer readable storage medium that, when executed by a processor, cause the processor to:
execute a mirror test, the mirror test comprising an execution of actions on target controls on a master device to cause the master device to produce a response to the execution of actions on the target controls on the master device and mimicking the actions on target controls on a number of slave devices for localization functional testing to cause each slave device of the slave devices to produce a response to the mimicked actions on the target controls of the each slave device;
prioritize a plurality of identification properties (IPs) associated with the target controls on the master device, wherein the plurality of IPs comprise first IPs associated with a first priority and second IPs associated with a second priority lower than the first priority;
send information regarding to the target controls on the master device, the actions, and the prioritized plurality of IPs to the number of slave devices;
search for the target controls on the number of slave devices to mimic the execution of the actions on the target controls of the master device, wherein searching for the target controls on the number of slave devices comprises:
  applying the first IPs in an attempt to find the target controls on the number of slave devices, wherein the first IPs comprise an automated identification; and
  in response to the applying of the first IPs failing to find the target controls on the number of slave devices, applying the second IPs to find the target controls on the number of slave devices, wherein the second IPs comprise at least one of a translated text via a translation string-map, an index, and a location;
capture at least one screenshot of the mirror test to capture the response produced by the master device and at least one response of the responses produced by the slave devices; and
generate data to display the at least one screenshot to a user.

12. The computer program product of claim 11, wherein the instructions, when executed by the processor, further cause the processor to record IPs of the target controls on the master device and the actions on the target controls of the master device.

13. The computer program product of claim 12, wherein the IPs recorded by the master device comprise a hypertext markup language (HTML) identification, the translated text, the index, or the location.

14. The computer program product of claim 11, wherein the instructions, when executed by the processor, further cause the processor to associate a third group of IPs of the plurality of IPs with a third priority lower than the second priority.

15. The system of claim 7, wherein the second group of IPs comprise the translated text via the translation string-map.

16. The computer program product of claim 11, wherein the second group of IPs comprise the translated text via the translation string-map.

17. The method of claim 1, wherein searching for the target controls on the number of slave devices comprises translating of the plurality of IPs using the translation string-map and checking the translation of the plurality of IPs using the translation string-map and wherein the translation string-map supports patterns and parameters that is more accurate than the translating and checking translation via dictionaries, the method further comprising:
  executing the found target controls on the number of slave devices.

18. The system of claim 7, wherein searching for the target controls on the number of slave devices comprises translating of the plurality of IPs using the translation string-map and checking the translation of the plurality of IPs using the translation string-map and wherein the translation string-map supports patterns and parameters that is more accurate than the translating and checking translation via dictionaries.

19. The computer program product of claim 11, wherein the instructions, when executed by the processor, further cause the processor to search for the target controls on the number of slave devices comprises translating of the plurality of IPs using the translation string-map and checking the translation of the plurality of IPs using the translation string-map and wherein the translation string-map supports patterns and parameters that is more accurate than the translating and checking translation via dictionaries.

\* \* \* \* \*